(12) United States Patent
Meng et al.

(10) Patent No.: US 11,544,308 B2
(45) Date of Patent: Jan. 3, 2023

(54) SEMANTIC MATCHING OF SEARCH TERMS TO RESULTS

(71) Applicant: Microsoft Technology Licensing, LLC, Redmond, WA (US)

(72) Inventors: Meng Meng, San Jose, CA (US); Gheorghe Muresan, Sunnyvale, CA (US); Ada Cheuk Ying Yu, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 16/367,820

(22) Filed: Mar. 28, 2019

(65) Prior Publication Data

US 2020/0311112 A1    Oct. 1, 2020

(51) Int. Cl.
| | | |
|---|---|---|
| *G06F 16/00* | (2019.01) | |
| *G06F 16/33* | (2019.01) | |
| *G06F 16/31* | (2019.01) | |
| *G06Q 10/06* | (2012.01) | |
| *G06N 20/00* | (2019.01) | |
| *G06F 16/9535* | (2019.01) | |

(52) U.S. Cl.
CPC .......... *G06F 16/3346* (2019.01); *G06F 16/31* (2019.01); *G06F 16/9535* (2019.01); *G06N 20/00* (2019.01); *G06Q 10/063112* (2013.01)

(58) Field of Classification Search
CPC .. G06F 16/3346; G06F 16/9535; G06F 16/31; G06N 20/00; G06Q 10/063112

USPC ........................................................ 707/730
See application file for complete search history.

(56) References Cited

U.S. PATENT DOCUMENTS

| | | | | |
|---|---|---|---|---|
| 10,515,091 | B2* | 12/2019 | Malherbe | G06F 16/258 |
| 2008/0104542 | A1* | 5/2008 | Cohen | G06F 16/951 |
| | | | | 715/810 |
| 2010/0030743 | A1* | 2/2010 | Lim | G06Q 30/0203 |
| | | | | 707/758 |
| 2017/0300565 | A1* | 10/2017 | Calapodescu | G06F 16/93 |
| 2017/0300862 | A1* | 10/2017 | Bhadouria | G06N 20/00 |
| 2018/0150534 | A1* | 5/2018 | Malherbe | G06F 16/958 |
| 2019/0018884 | A1* | 1/2019 | Wakankar | G06F 16/248 |
| 2019/0325863 | A1* | 10/2019 | Martin | G06F 16/3323 |

OTHER PUBLICATIONS

"Fast text", Retrieved from: https://fasttext.cc/, Retrieved Date: Jan. 15, 2019, 4 Pages.

(Continued)

*Primary Examiner* — Vincent F Boccio
(74) *Attorney, Agent, or Firm* — Schwegman Lundberg & Woessner, P.A.

(57) ABSTRACT

The disclosed embodiments provide a system for processing data. During operation, the system obtains labels for entities found in portions of text in a first set of jobs. Next, the system inputs the portions of text and the labels as training data for a machine learning model. The system then applies the machine learning model to a second set of jobs to generate predictions of additional entities in additional portions of text in the second set of jobs. Finally, the system creates, based on the predictions, an index containing mappings of the additional entities to subsets of the second set of jobs in which the additional entities are found.

21 Claims, 5 Drawing Sheets

(56) References Cited

OTHER PUBLICATIONS

Bojanowski, et al., "Enriching Word Vectors with Subword Information", In Journal of Computing Research Repository, Jul. 2016, 12 Pages.
Joulin, et al., "Bag of Tricks for Efficient Text Classification", In Journal of Computing Research Repository, Jul. 2016, 5 Pages.
Mikolov, et al., "Distributed Representations of Words and Phrases and their Compositionality", In Journal of Computing Research Repository, Oct. 2013, pp. 1-9.
"Precision and Recall", Retrieved from: http://en.wikipedia.org/wiki/Precision_and_recall, Retrieved Date:Jan. 15, 2019, 4 Pages.

* cited by examiner

SEMANTIC MATCHING OF SEARCH TERMS TO RESULTS

BACKGROUND

Field

The disclosed embodiments relate to techniques for generating search results. More specifically, the disclosed embodiments relate to techniques for performing semantic matching of search terms to results.

Related Art

Online networks may include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be tracked and/or maintained on web-based networking services, such as online networks that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals may use an online network to locate prospects, maintain a professional image, establish and maintain relationships, and/or engage with other individuals and organizations. Similarly, recruiters may use the online network to search for candidates for job opportunities and/or open positions. At the same time, job seekers may use the online network to enhance their professional reputations, conduct job searches, reach out to connections for job opportunities, and apply to job listings.

During a job search, a candidate may submit search terms representing a title, industry, job function, seniority, skill, company name, location, and/or another attribute of a job posting. The search terms may be matched to corresponding fields in structured data in job postings. On the other hand, some or all posted jobs may include unstructured data that lacks predefined and/or user-specified attributes. In these instances, search terms in the job search may be matched to the content of the posted jobs, which can cause irrelevant jobs containing some search terms that are used in non-job-related contexts to be included in search results of the job search. For example, a job search query containing the word "fitness" may be conducted by a candidate that is interested in jobs in the fitness industry. However, results of the query may include jobs with job descriptions that mention fitness memberships as job benefits. In another example, a job search that contains a keyword of "LinkedIn" may return results that include jobs posted by a company named "LinkedIn," as well as jobs that suggest using "LinkedIn" as a way to follow the employers of the jobs.

BRIEF DESCRIPTION OF THE FIGURES

In the figures, like reference numerals refer to the same figure elements.

DETAILED DESCRIPTION

Figure 1:
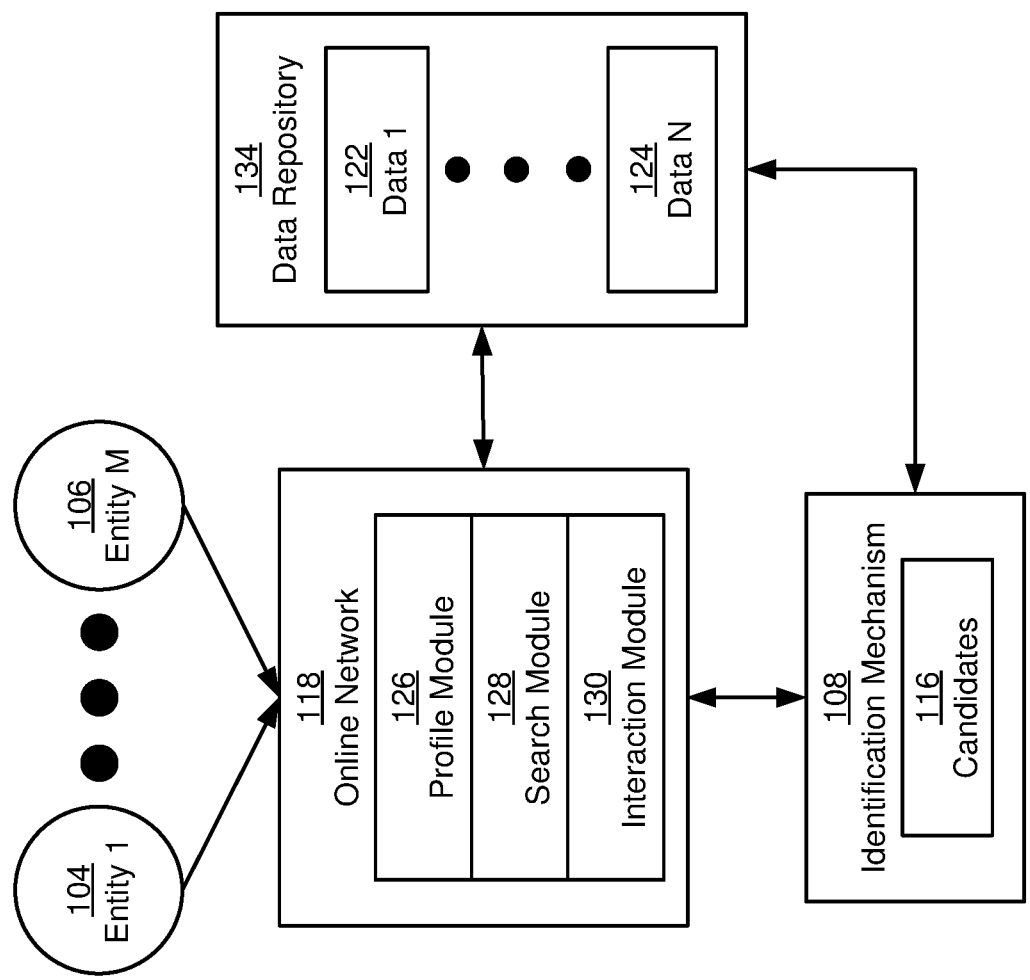
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for improving job searches. Each job search may include one or more keywords, which are converted into standardized entities before the keyword(s) are matched to jobs containing the keyword(s). For example, a candidate may perform a job search using search terms of "sw engineer." The search terms may be matched to a standardized title of "Software Engineer" and/or an identifier for the standardized "Software Engineer" title.

More specifically, the disclosed embodiments provide a method, apparatus, and system for performing semantic matching of search terms to search results. A machine learning model is trained to predict a named entity (e.g., job title, company, industry, function, location, seniority, skill, etc.) associated with a keyword in a job description and/or other text in a job posting based on a label for the entity that is generated from structured data for the job posting and/or human input. The machine learning model is also applied to text in additional jobs to identify entities associated with keywords in the additional jobs. Mappings of the identified entities to the corresponding jobs are then stored in an index and/or another data structure.

The mappings are subsequently used to generate search results for job searches. For example, one or more entities extracted from a job search by a candidate may be matched to the corresponding mappings in the index, and jobs identified in some or all of the mappings may be added to search results for the job search. The search results may then be ranked by relevance to the candidate's explicit or inferred preferences or interests, the strength of the candidate's qualifications with respect to each job, and/or other criteria before the search results are outputted to the candidate.

By predicting entities in text for posted jobs and matching the entities to search terms in job searches, the disclosed embodiments verify that the semantic context of keywords in the jobs matches the intent of candidates and/or other users performing the job searches. In turn, the disclosed embodiments may increase the relevance of search results, rankings, and/or other output generated in response to the job searches. In contrast, conventional techniques may generate job search results by searching the content of posted jobs for keywords specified in search terms without considering the semantic usage of the keywords in the job descriptions. As a result, the conventional techniques may produce search results containing jobs that use the keywords in contexts that lack relevance to the intent of users performing the job searches, which may reduce the usefulness and/or value of the search results to the users and/or moderators involved in hiring for the jobs. Consequently, the disclosed embodiments may improve computer systems, applications, user experiences, tools, and/or technologies related to entity recognition, search, user recommendations, employment, recruiting, job seeking, and/or hiring.

Semantic Matching of Search Terms to Results

FIG. 1 shows a schematic of a system in accordance with the disclosed embodiments. As shown in FIG. 1, the system may include an online network 118 and/or other user community. For example, online network 118 may include an online professional network that is used by a set of entities (e.g., entity 1 104, entity m 106) to interact with one another in a professional and/or business context.

The entities may include users that use online network 118 to establish and maintain professional connections, list work and community experience, endorse and/or recommend one another, search and apply for jobs, and/or perform other actions. The entities may also include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online network 118.

Profile module 126 may additionally include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data n 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 may be tracked and stored in a database, data warehouse, cloud storage, and/or other data-storage mechanism providing data repository 134.

Data in data repository 134 may then be used to generate recommendations and/or other insights related to listings of jobs or opportunities within online network 118. For example, one or more components of online network 118 may track searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend a number of job listings to current or potential job seekers in online network 118.

More specifically, data in data repository 134 and one or more machine learning models are used to produce rankings of candidates associated with jobs or opportunities listed within or outside online network 118. As shown in FIG. 1, an identification mechanism 108 identifies candidates 116 associated with the opportunities. For example, identification mechanism 108 may identify candidates 116 as users who have viewed, searched for, and/or applied to jobs, positions, roles, and/or opportunities, within or outside online network 118. Identification mechanism 108 may also, or instead, identify candidates 116 as users and/or members of online network 118 with skills, work experience, and/or other attributes or qualifications that match the corresponding jobs, positions, roles, and/or opportunities.

After candidates 116 (e.g., users that are applicants or prospective applicants for jobs posted in online network 118) are identified, profile and/or activity data of candidates 116 may be inputted into the machine learning model(s), along with features and/or characteristics of the corresponding opportunities (e.g., required or desired skills, education, experience, industry, title, etc.). In turn, the machine learning model(s) may output scores representing the strengths of candidates 116 with respect to the opportunities and/or qualifications related to the opportunities (e.g., skills, current position, previous positions, overall qualifications, etc.). For example, the machine learning model(s) may generate scores based on similarities between the candidates' profile data with online network 118 and descriptions of the opportunities. The model(s) may further adjust the scores based on social and/or other validation of the candidates' profile data (e.g., endorsements of skills, recommendations, accomplishments, awards, patents, publications, reputation scores, etc.). The rankings may then be generated by ordering candidates 116 by descending score.

In turn, rankings based on the scores and/or associated insights may improve the quality of candidates 116 (e.g., the extent to which candidates 116 meet requirements or qualifications of jobs in online network 118), recommendations of opportunities to candidates 116, and/or recommendations of candidates 116 for opportunities. Such rankings may also, or instead, increase user activity with online network 118 and/or guide the decisions of candidates 116 and/or moderators involved in screening for or placing the opportunities (e.g., hiring managers, recruiters, human resources professionals, etc.). For example, one or more components of online network 118 may display and/or otherwise output a member's position (e.g., top 10%, top 20 out of 138, etc.) in a ranking of candidates for a job to encourage the member to apply for jobs in which the member is highly ranked. In a second example, the component(s) may account for a candidate's relative position in rankings for a set of jobs during ordering of the jobs as search results in response to a job search by the job candidate. In a third example, the component(s) may output a ranking of job candidates for a given set of job qualifications as search results to a recruiter after the recruiter performs a search with the job qualifications included as parameters of the search. In a fourth example, the component(s) may output a ranking of jobs as search results to a job candidate after the job candidate specifies one or more attributes of the jobs in a job search. In a fifth example, the component(s) may recommend jobs to a candidate based on the predicted relevance or attractiveness of the jobs to the candidate and/or the candidate's likelihood of applying to the jobs.

Figure 2:
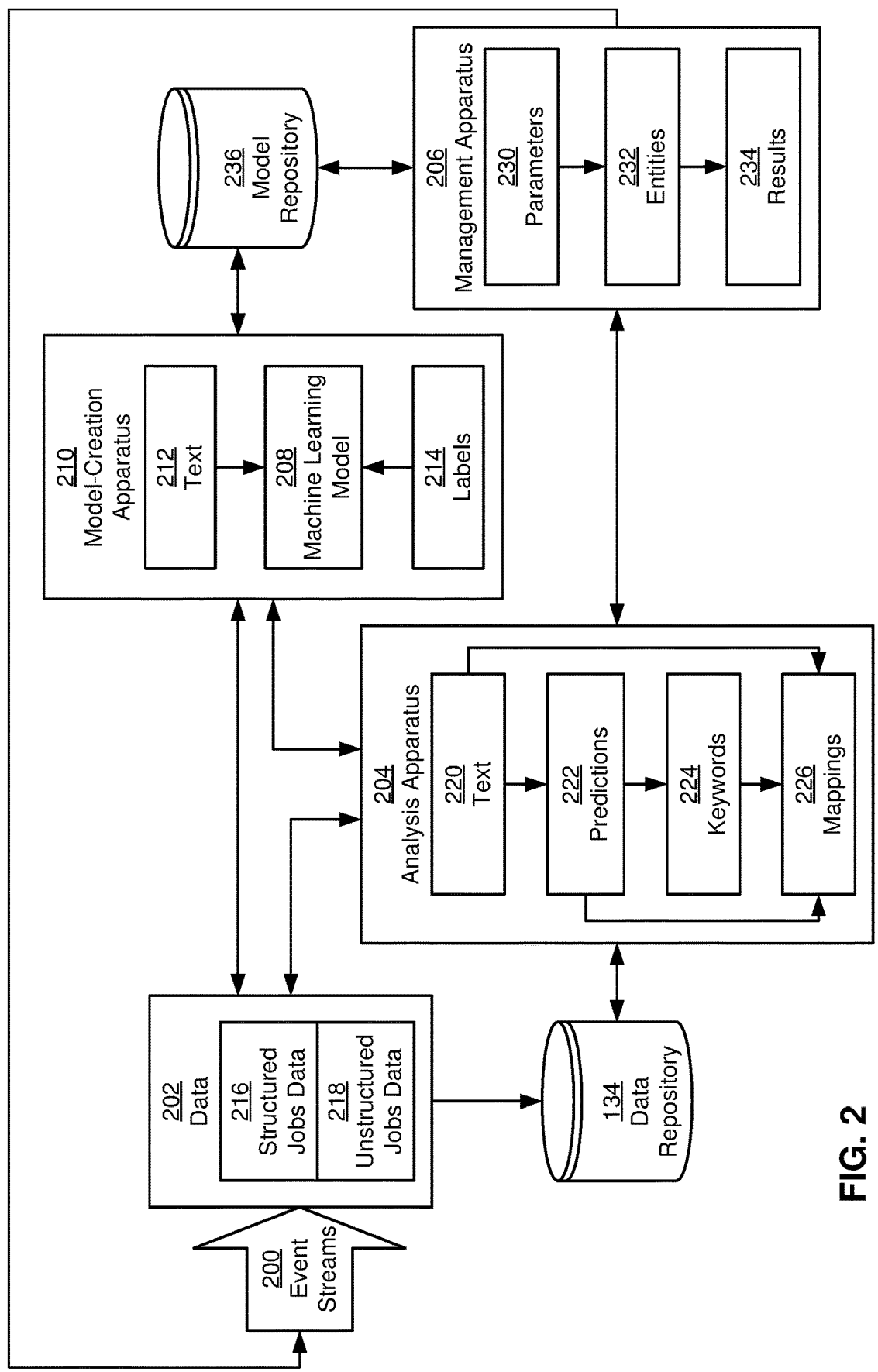
FIG. 2 shows a system for processing data in accordance with the disclosed embodiments.

In one or more embodiments, online network 118 includes functionality to improve rankings and/or recommendations related to candidates 116 for opportunities by generating the rankings and/or recommendations based on semantic entities identified in jobs posted within or outside online network 118. As shown in FIG. 2, data repository 134 and/or another primary data store may be queried for data 202 that includes structured jobs data 216 and unstructured jobs data 218 for jobs that are posted or described within or outside an online network (e.g., online network 118 of FIG. 1).

Structured jobs data 216 includes structured representations of entities 232 associated with each job, which can be provided by a recruiter, hiring manager, and/or other moderator during posting of the job in the online network. For example, the moderator may enter named entities 232 such as the job's function, role, title, industry, seniority, location, industry, required skills, responsibilities, salary range, benefits, education level, and/or other attributes into different text fields within a user interface provided by the online network.

Conversely, unstructured jobs data 218 may include unstructured and/or freeform text that lacks user-specified entities 232. For example, the online network may include functionality to "import" jobs through distribution partnerships, application-programming interfaces (APIs), scraping, data feeds, and/or other data sources. As a result, such jobs may lack user-specified fields that identify titles, functions, roles, industries, seniorities, locations, skills, and/or other entities 232 or job attributes in the jobs.

In one or more embodiments, data repository 134 stores data 202 that represents standardized, organized, and/or classified attributes. For example, skills in structured jobs data 216 and/or unstructured jobs data 218 may be organized into a hierarchical taxonomy that is stored in data repository 134. The taxonomy may model relationships between skills and/or sets of related skills (e.g., "Java programming" is related to or a subset of "software engineering") and/or standardize identical or highly related skills (e.g., "Java programming," "Java development," "Android development," and "Java programming language" are standardized to "Java").

In another example, locations in data repository 134 may include cities, metropolitan areas, states, countries, continents, and/or other standardized geographical regions. Like standardized skills, the locations may be organized into a hierarchical taxonomy (e.g., cities are organized under states, which are organized under countries, which are organized under continents, etc.).

In a third example, data repository 134 includes standardized company names for a set of known and/or verified companies associated with the members and/or jobs. In a fourth example, data repository 134 includes standardized titles, seniorities, and/or industries for various jobs, members, and/or companies in the online network. In a fifth example, data repository 134 includes standardized time periods (e.g., daily, weekly, monthly, quarterly, yearly, etc.) that can be used to retrieve profile data 216, jobs data 218, and/or other data 202 that is represented by the time periods (e.g., starting a job in a given month or year, graduating from university within a five-year span, job listings posted within a two-week period, etc.). In a sixth example, data repository 134 includes standardized job functions such as "accounting," "consulting," "education," "engineering," "finance," "healthcare services," "information technology," "legal," "operations," "real estate," "research," and/or "sales."

In some embodiments, standardized attributes in data repository 134 are represented by unique identifiers (IDs) in the corresponding taxonomies. For example, each standardized skill may be represented by a numeric skill ID in data repository 134, each standardized title may be represented by a numeric title ID in data repository 134, each standardized location may be represented by a numeric location ID in data repository 134, and/or each standardized company name (e.g., for companies that exceed a certain size and/or level of exposure in the online system) may be represented by a numeric company ID in data repository 134.

Data 202 in data repository 134 may further be updated using records of recent activity received over one or more event streams 200. For example, event streams 200 may be generated and/or maintained using a distributed streaming platform such as Apache Kafka (Kafka™ is a registered trademark of the Apache Software Foundation). One or more event streams 200 may also, or instead, be provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the community may be generated in response to the activity. The record may then be propagated to components subscribing to event streams 200 on a near-realtime basis.

A model-creation apparatus 210 creates and/or updates a machine learning model 208 based on text 212 and/or identifiers from structured jobs data 216, unstructured jobs data 218, and/or other data 202 in data repository 134; labels 214 associated with text 212; and predictions produced by machine learning model 208 from text 212. More specifically, model-creation apparatus 210 trains machine learning model 208 to predict entities 232 (e.g., named entities) in text 212 based on labels 214 that identify entities 232 within portions of text 212.

Entities 232 include named entities associated with keywords 224 in text 212. For example, entities 232 associated with jobs in data repository 134 may include companies, titles, industries, seniorities, functions, roles, types of employment (e.g., full-time, part-time, temporary, internship, unpaid, etc.), skills, and/or locations of the jobs. To specify an entity within text 212 for a job, the entity's location in text 212 may be tagged with a corresponding entity type. For example, the sentence "We are located in New York City" may include an entity of "New York City" that is tagged with an entity type of "location" to produce the following "tagged" representation of the sentence: "We are located in <location>New York City</location>."

Keywords 224 include semantically meaningful and/or relevant words or phrases in text 212 for jobs. For example, keywords 224 may be identified as words remaining in text 212 after stemming, lemmatization, stopword removal, and/or other text cleaning techniques are applied to text 212. In another example, keywords 224 may include standardized titles, industries, functions, locations, time periods, seniorities, roles, types of employments, and/or other attributes in data repository 134. In a third example, keywords 224 may include parameters 230 (e.g., search terms) specified in job searches by candidates.

Model-creation apparatus 210 and/or another component generate labels 214 for entities 232 in text 212 based on structured jobs data 216 in data repository 134. For example, the component may obtain entities 232 such as a title, company, industry, location, seniority, and/or required skills for a job from corresponding fields in structured data 216 for the job. The component may identify additional locations of entities 232 in the job description for the job and/or other content related to the job and tag the locations with the corresponding entity types.

The component may also, or instead, obtain labels 214 based on user input. For example, the component may display structured jobs data 216 and/or unstructured jobs data 218 for a job to a user within a user interface and/or crowdsourcing platform, and the user may tag words and/or phrases in the displayed data with the corresponding entity types.

In one or more embodiments, labels 214 include entities 232 that are relevant to job seekers, as well as entities 232 that are irrelevant to job seekers. For example, entities 232 that are relevant to job seekers may include, but are not limited to, titles (e.g., a title of "Designer" in the sentence "Our client has a need for a mid-level Designer"), companies (e.g., a company of "LinkedIn" in the sentence "At LinkedIn, we strive to help our employees find passion and purpose"), job locations (e.g., a job location of "Dallas, Tex." in the sentence "We are looking to grow our team in Dallas, Tex."), industries (e.g., an industry of "biotechnology" in the sentence "Our client is a rapidly growing biotechnology startup"), functions (e.g., a function of "engineering" in the sentence "You will be leading an engineering team of 5-10 people"), and/or skills (e.g., skills of "C++," "Scala," and "Java" in the sentence "Experience with C++, Scala, or Java is required for this position"). Entities 232 that are irrelevant to job seekers may include, but are not limited to, job benefits (e.g., a benefit of "fitness memberships" in the sentence "The wellness program provides reimbursements for fitness memberships"), social media entities (e.g., a social media entity of "LinkedIn" in the sentence "follow our company on LinkedIn"), and/or entities 232 that are labeled as "other," "unknown," or "irrelevant."

To train machine learning model 212, model-creation apparatus 210 inputs representations of text 212 in which labeled entities are found into machine learning model 208. For example, machine learning model 208 may include a fastText model that classifies a fixed-size window of text 212 based on vector representations of words in the window. The fastText model may additionally generate vector representations of each word as the sum of vector representations of a set of n-grams in the word. Thus, the word "where" may be represented in the model as a set of trigrams that includes "#wh," "whe," "her," "ere," and "re #" (counting a special character representing a word boundary on either side of the word), in lieu of or in addition to the full sequence of characters in the word. Input into machine learning model 208 may thus include collections of words and/or sub-words in sliding windows of text 212 that adhere to the fixed size, with each window of text containing one or more keywords 224 that have been labeled with the corresponding entities 232.

Next, model-creation apparatus 210 updates parameters of machine learning model 208 based on differences between scores and/or other predictions 222 outputted by machine learning model 208 and labels 214 associated with predictions 222. More specifically, model-creation apparatus 210 may use a training technique and/or one or more hyperparameters to update parameter values of machine learning model 208 so that predictions 222 produced by machine learning model 208 from text 212 better reflect labels 214 for text 212. For example, model-creation apparatus 210 may iteratively train a fastText model to combine vector representations (i.e., embeddings) for words and/or sub-words in windows of text 212 in a way that produces the corresponding labels 214. Model-creation apparatus 210 may then store updated parameter values and/or other data associated with machine learning model 208 in a model repository 236 and/or another data store for subsequent retrieval and use.

After machine learning model 208 is created and/or updated by model-creation apparatus 210, an analysis apparatus 204 obtains a representation of machine learning model 208 from model-creation apparatus 210, model repository 236, and/or another source. Next, analysis apparatus 204 applies machine learning model 208 to text 220 in additional jobs to generate predictions 222 of entities 232 for keywords 224 in text 220. For example, analysis apparatus 204 may use machine learning model 208 to identify entities 232 in jobs with unstructured jobs data 218, job descriptions in jobs, and/or other freeform text representations of jobs.

In one or more embodiments, analysis apparatus 204 generates predictions 222 of entities 232 for keywords 224 by identifying one or more keywords 224 in unstructured and/or freeform text 220 for a job, inputting one or more fixed-size windows of text 220 around each keyword into machine learning model 208, and aggregating predictions 222 generated by machine learning model 208 from the inputted windows of text 220. For example, analysis apparatus 204 may identify and/or locate a keyword of "Software Engineer" in the sentence "We are looking for a talented Software Engineer to join our team." Next, analysis apparatus 204 may input, into machine learning model 208, the following windows of text 220 with a fixed window size of 8: "We are looking for a talented Software Engineer," "are looking for a talented Software Engineer to," "looking for a talented Software Engineer to join," "for a talented Software Engineer to join our," and "a talented Software Engineer to join our team." For each text window inputted into machine learning model 208, analysis apparatus 204 may obtain output scores that include predicted likelihoods of different types of entities 232 in the text window. Analysis apparatus 204 may then average, sum, and/or otherwise aggregate scores across all text windows containing the keyword into an overall set of scores for the keyword and generate a final prediction for the keyword as one or more entities 232 with overall scores for the keyword that exceed a threshold.

After predictions 222 of entities 232 are generated for all keywords 224 located in text 220 for the additional jobs, analysis apparatus 204 stores mappings 226 of entities 232 to jobs in which predictions 222 of the entities were found. For example, analysis apparatus 204 may create an inverted index and/or another type of data structure that maps each entity-keyword pair (e.g., a company of "LinkedIn" as one entity-keyword pair and a social media entity of "LinkedIn" as another entity-keyword pair) to a set of jobs in which the entity-keyword pair is found. Within each mapping of an entity to jobs in which the entity is found, analysis apparatus 204 may optionally store the highest score (e.g., likelihood) outputted by machine learning model 208 for the entity from text 220 for each job in the mapping. Analysis apparatus 204 may store the data structure in data repository 134 and/or another data store for subsequent retrieval and use.

A management apparatus 206 uses mappings 226 created by analysis apparatus 204 to process job searches and/or other queries containing parameters 230 related to entities 232 and/or keywords 224 in structured jobs data 216, unstructured jobs data 218, and/or other job-related data 202 in data repository 134. For example, management apparatus 206 may form a part of and/or execute in conjunction with a job search tool, job recommendation module, employment website, recruiting tool, and/or online network. Management apparatus 206 may include checkboxes, radio buttons, drop-down menus, text boxes, and/or other user-interface elements that allow a candidate and/or another entity involved in job-seeking, employment, hiring, and/or recruiting to specify parameters 230 related to jobs and/or opportunities.

Parameters 230 may include entities 232 that are explicitly specified by a user performing a job search and/or other job-related query. For example, a candidate may use an "advanced search" feature to specify thresholds, values, and/or ranges of values for a title, industry, seniority, function, company, location, education, skills, and/or other entities 232 related to jobs or opportunities.

Alternatively, parameters 230 may include keywords 224 that are matched to entities 232 by management apparatus 206 and/or another component. For example, a candidate may input one or more keywords 224 into a single text field within a "basic search" feature, and the component may tag each keyword with a corresponding entity type by matching keywords 224 to standardized company names, titles, skills, locations, and/or other values for various types of entities 232. The component may then rewrite keywords 224 in a given query by converting each keyword into the corresponding entity type and standardized value (e.g., converting a misspelled, abbreviated, and/or non-standardized company name, title, location, and/or other entity into a standardized identifier or value for the entity).

After entities 232 are extracted from parameters 230 of a given job search, management apparatus 206 matches entities 232 to the corresponding mappings 226 created by analysis apparatus 204 and uses jobs in mappings 226 to generate results 234 of the search. For example, management apparatus 206 may search an inverted index provided by analysis apparatus 204, data repository 134, and/or another component for mappings 226 containing entities 232 identified in parameters 230. Management apparatus 206 may obtain multiple sets of jobs from the identified mappings 226 and combine the multiple sets of jobs into a single set of jobs using an intersection, union, and/or another set operation. Management apparatus 206 may optionally apply a threshold to scores associated with entities 232 found in the jobs to remove jobs that contain entities 232 with low confidence from results 234.

Continuing with the above example, management apparatus 206 may apply one or more machine learning models (not shown) from model-creation apparatus 210, model repository 236, and/or another source to features related to the set of jobs and the user performing the search to generate match scores between the user and the jobs. Each match score may represent the likelihood of a positive outcome between the user and a corresponding job, such as the user applying to the job, the user receiving a response to the job application, adding of the user to a hiring pipeline for the job, interviewing of the user for the job, and/or hiring of the user for the job. Management apparatus 206 may then rank the jobs by descending match score and output some or all of the ranking to the user as search results 234 of the search. Subsequent responses and/or outcomes related to results 234 may, in turn, be used to generate events that are fed back into the system and used to update machine learning model 208, mappings 226, entities 232, and/or results 234.

Management apparatus 206 may also, or instead, use scores and/or other predictions 222 of entities 232 outputted by machine learning model 208 to adjust the ranking of the corresponding jobs in results 234. For example, management apparatus 206 may input scores representing predicted likelihoods of entities 232 in each job into one or more machine learning models that generate match scores by which jobs in results 234 are ranked. In turn, management apparatus 206 may implement a "soft filter" that lowers the position of a job in a ranking of search results 234 when the job is associated with lower predicted likelihoods of one or more entities 232 specified in parameters 230 of the corresponding search.

By predicting entities 232 in text 220 for posted jobs and matching entities 232 to parameters 230 in job searches, the system of FIG. 2 verifies that the semantic context of keywords 224 in the jobs matches the intent of candidates and/or other users performing the job searches. In turn, the system of FIG. 2 may increase the relevance of search results 234, rankings, and/or other output generated in response to the job searches. In contrast, conventional techniques may generate job search results by searching the content of posted jobs for keywords specified in search terms without considering the semantic usage of the keywords in the jobs. As a result, the conventional techniques may produce search results containing jobs that use the keywords in contexts that lack relevance to the intent of users performing the job searches, which may reduce the usefulness and/or value of the search results to the users and/or moderators involved in hiring for the jobs. Consequently, the disclosed embodiments may improve computer systems, applications, user experiences, tools, and/or technologies related to entity recognition, search, user recommendations, employment, recruiting, job seeking, and/or hiring.

Those skilled in the art will appreciate that the system of FIG. 2 may be implemented in a variety of ways. First, analysis apparatus 204, model-creation apparatus 210, management apparatus 206, data repository 134, and/or model repository 236 may be provided by a single physical machine, multiple computer systems, one or more virtual machines, a grid, one or more databases, one or more filesystems, and/or a cloud computing system. Analysis apparatus 204, model-creation apparatus 210, and management apparatus 206 may additionally be implemented together and/or separately by one or more hardware and/or software components and/or layers.

Second, a number of models and/or techniques may be used to generate predictions 222, keywords 224, mappings 226, entities 232, and/or results 234. For example, the functionality of machine learning model 208 may be provided by a Large-Scale Information Network Embedding (LINE), principal component analysis (PCA), latent semantic analysis (LSA), and/or other technique that generates a low-dimensional embedding space from documents and/or terms. Machine learning model 208 may also, or instead, be implemented as a long short-term memory (LSTM) network, recurrent neural network, recursive neural network, convolutional neural network, and/or another deep learning technique that processes sequential data. Multiple versions of machine learning model 208 may be adapted to different subsets of jobs and/or entities 232, or the same machine learning model 208 may be used to generate predictions 222 of entities 232 for keywords 224 in all jobs. The retraining or execution of machine learning model 208 may further be performed on an offline, online, and/or on-demand basis to accommodate requirements or limitations associated with the processing, performance, or scalability of the system and/or the availability of text 212 and/or labels 214 used to train machine learning model 208.

Third, the system of FIG. 2 may be adapted to different types of opportunities, entities 232, keywords 224, and/or parameters 230. For example, machine learning model 208 may be used to identify entities 232 in keywords 224 and/or text 220 related to awards, publications, patents, group memberships, profile summaries, academic positions, artistic or musical roles, fields of study, fellowships, scholarships, competitions, hobbies, online dating matches, articles, and/or other attributes that can be used to generate search results and/or recommendations for users.

Figure 3:
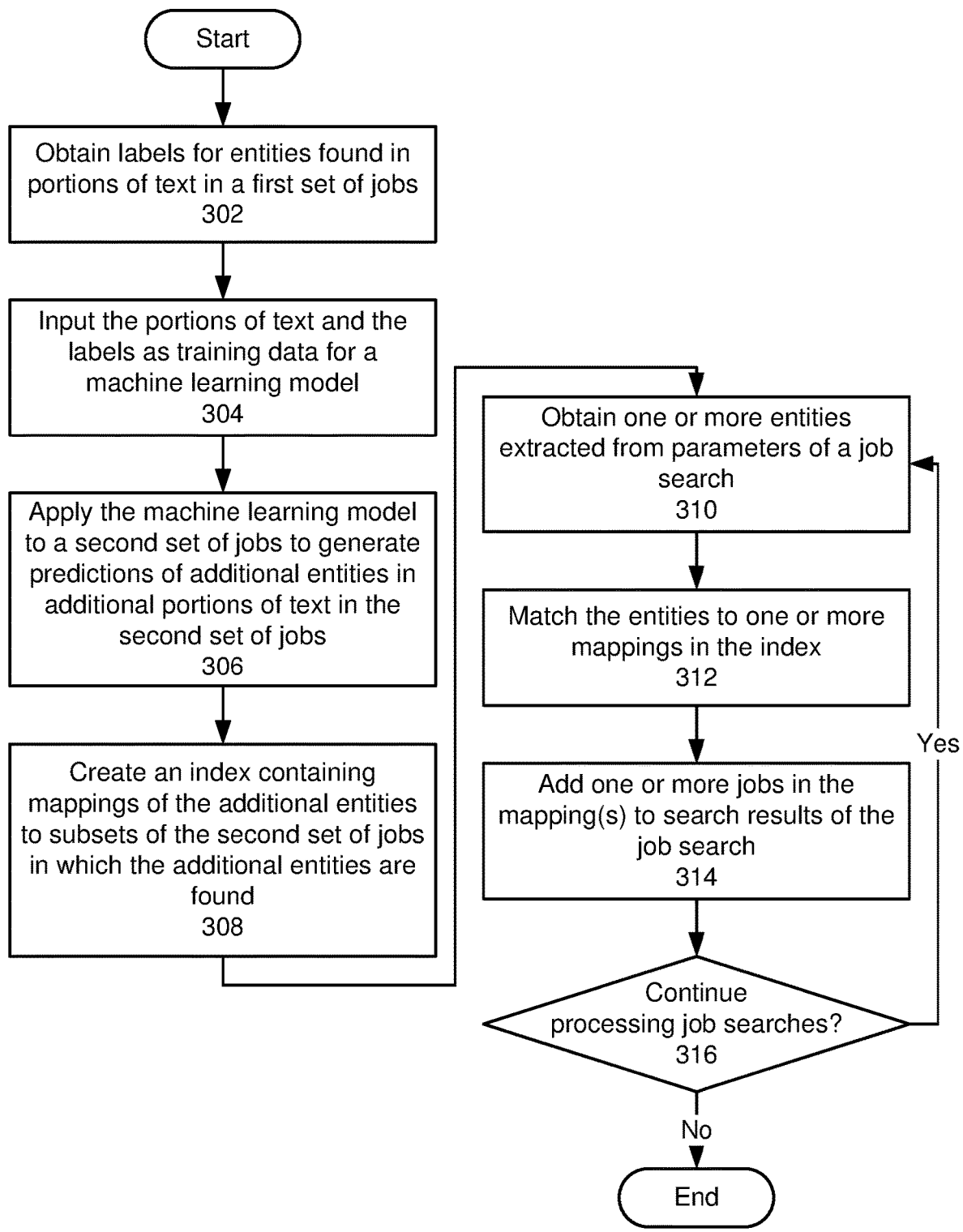
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, labels for entities found in portions of text in a first set of jobs are obtained (operation 302). For example, labels for companies, titles, types of employment, industries, functions, seniorities, skills, locations, job descriptions, and/or other entities may be obtained from fields in structured data for the jobs. In another example, labels for entities in the first set of jobs, including entities that are generally considered irrelevant to job searches, may be generated by users viewing the content of the jobs.

Next, the portions of text and the labels are inputted as training data for a machine learning model (operation 304). For example, the entities may be located in various portions of text in the jobs, and the machine learning model may be trained to predict the labels based on the portions of text containing the corresponding entities.

The trained machine learning model is applied to a second set of jobs to generate predictions of additional entities in additional portions of text in the second set of jobs (operation 306), as described in further detail below with respect to FIG. 4. An index containing mappings of the additional entities to subsets of the second set of jobs in which the additional entities are found is also created (operation 308). For example, each entity-keyword pair (or a standardized attribute or identifier representing the entity-keyword pair) may be mapped to one or more jobs in which the entity-keyword pair was identified by the machine learning model in operation 306. Each job in the mapping may also be stored with a score representing the predicted likelihood of the entity in the job.

After the index is created, the index is used to process job searches. In particular, one or more entities extracted from parameters of a job search are obtained (operation 310) and matched to one or more mappings in the index (operation 312). For example, each keyword and/or parameter specified in the job search may be matched to a standardized value for an entity. The standardized value may then be used to locate and/or retrieve a corresponding entry in the index.

One or more jobs in the mapping(s) are then added to search results of the job search (operation 314). Continuing with the above example, each entity extracted from parameters of the job search may be used to retrieve a set of jobs to which the entity is mapped in the index, and jobs that appear in some or all mappings of entities identified in operation 310 (i.e., jobs that contain some or all entities extracted from parameters of the job search) may be included in search results of the job search. The jobs may also, or instead, be ranked in the search results based on scores representing predicted likelihoods of the entities in the jobs.

Operations 310-314 may be repeated during processing of job searches (operation 316). In turn, search results generated using the index may be more relevant to candidates and/or other users performing the job searches than search results that are generated by matching keywords in search parameters to job content.

Figure 4:
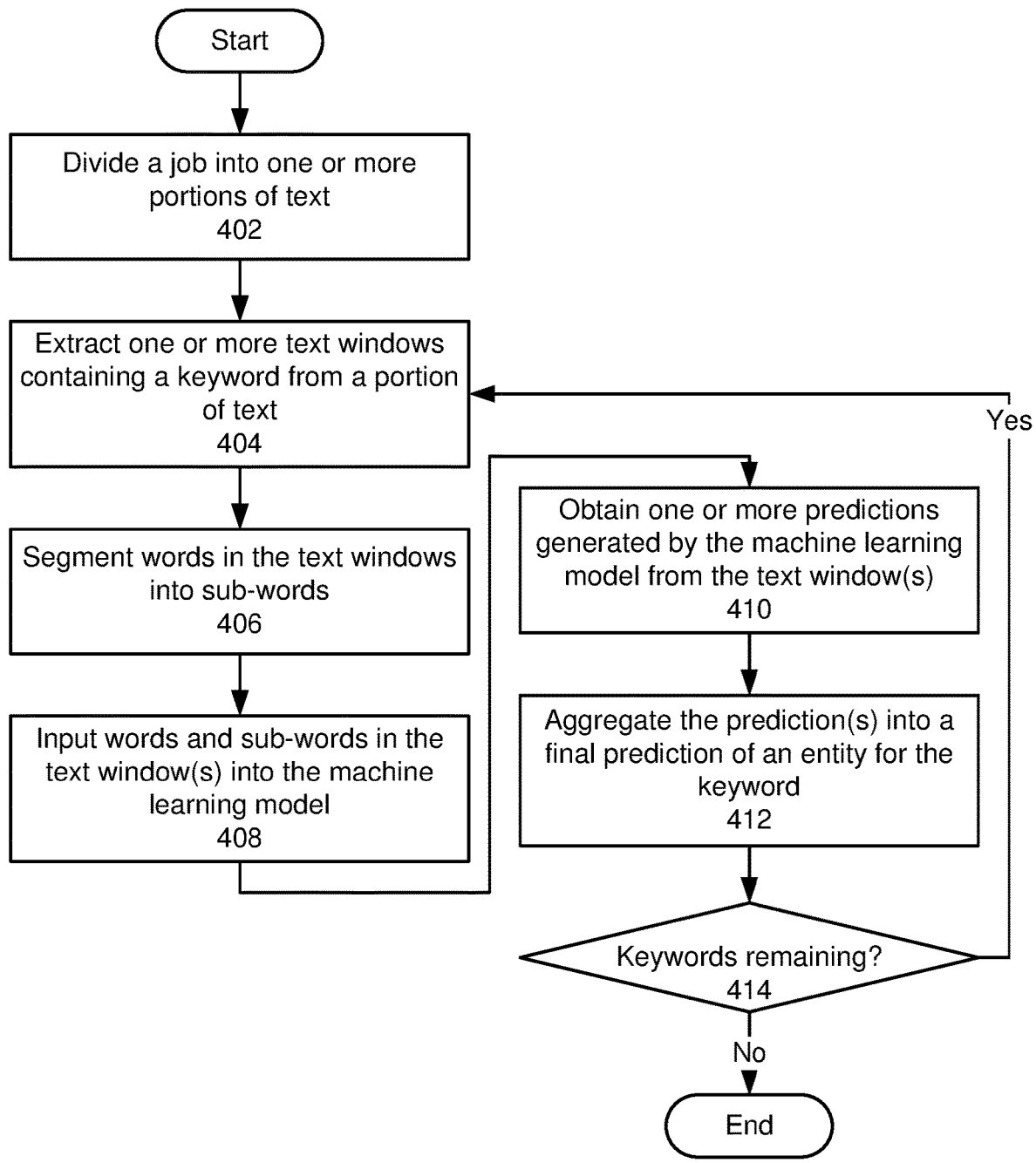
FIG. 4 shows a flowchart illustrating a process of identifying entities in text in accordance with the disclosed embodiments.

FIG. 4 shows a flowchart illustrating a process of identifying entities in text in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a job is divided into one or more portions of text (operation 402). For example, a job description and/or unstructured text for the job may be divided into individual sentences, paragraphs, lines, and/or other units of text.

Next, one or more text windows containing a keyword are extracted from a portion of text (operation 404). For example, various text windows of a fixed size (e.g., a certain number of words) that contain the keyword may be generated from a longer portion of text. Conversely, if the fixed size exceeds the length of the portion of text, the entire portion of text may be included in a single text window containing the keyword. Words in the text windows are also segmented into sub-words (operation 406). For example, each word (including spaces on either end of the word) may be divided into multiple n-grams of a certain length.

Words and sub-words in the text window(s) are then inputted into the machine learning model (operation 408), and one or more predictions generated by the machine learning model from the text window(s) are obtained (operation 410). For example, vector representations of the words and sub-words in each text window may be inputted into a fastText model, and the model may output scores representing predicted likelihoods of various entities in the text window.

Finally, the prediction(s) are aggregated into a final prediction of an entity for a keyword (operation 412). Continuing with the previous example, scores outputted by the fastText model for multiple text windows containing the keyword may be averaged, summed, and/or otherwise aggregated into a final set of scores, and the keyword may be assigned to the entity with the highest score and/or one or more entities with scores that exceed a threshold.

Operations 404-412 may be repeated for remaining keywords (operation 414) in the job. For example, text windows containing each keyword may be inputted into the machine learning model, and predictions generated by the machine learning model may be aggregated into a final prediction of an entity for the keyword, until all keywords in the job have been processed. Mappings of entities identified in the job to an identifier for the job may then be added to an index and/or another type of data structure that is used to process job searches in a semantically meaningful way, as discussed above.

Figure 5:
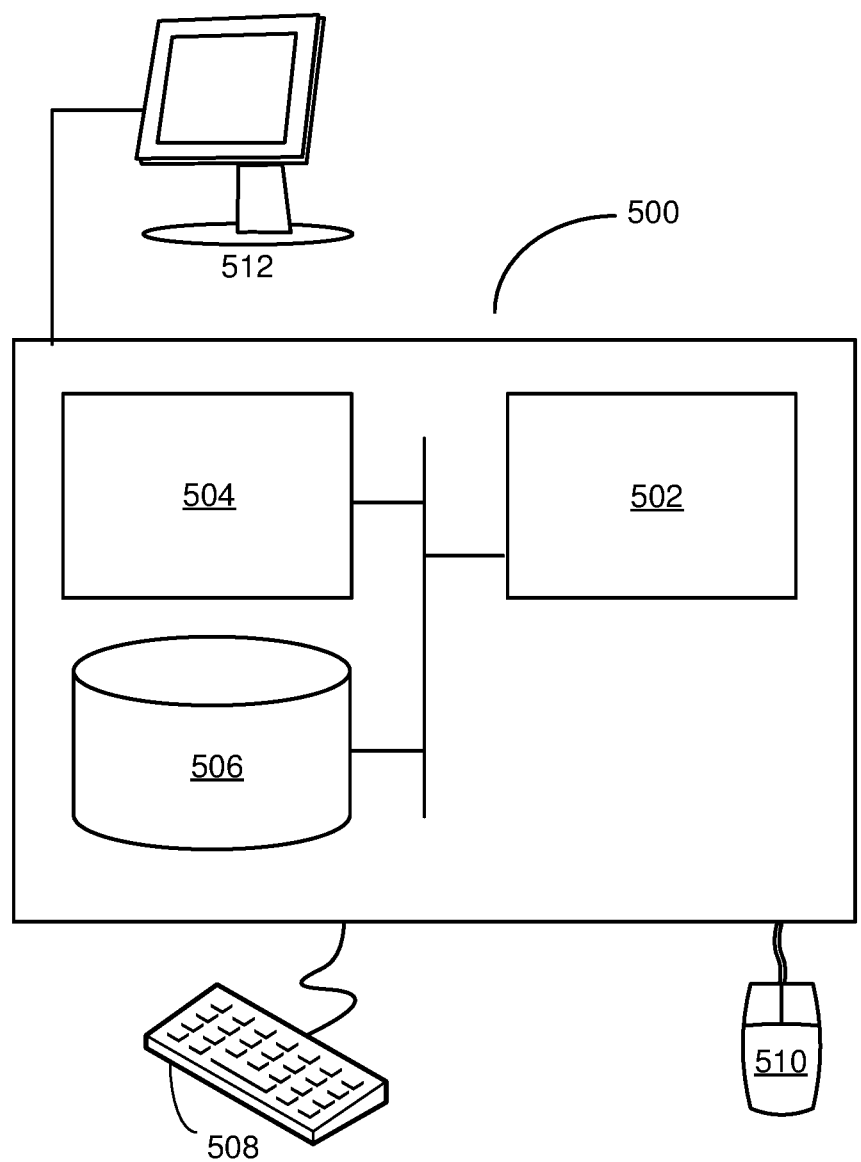
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data. The system includes an analysis apparatus, a model-creation apparatus, and a management apparatus, one or more of which may alternatively be termed or implemented as a module, mechanism, or other type of system component. The model-creation apparatus obtains labels for entities found in portions of text in a first set of jobs. Next, the model-creation apparatus inputs the portions of text and the labels as training data for a machine learning model. The analysis apparatus applies the machine learning model to a second set of jobs to generate predictions of additional entities in additional portions of text in the second set of jobs. The analysis apparatus also creates, based on the predictions, an index containing mappings of the additional entities to subsets of the second set of jobs in which the additional entities are found.

The management apparatus obtains one or more entities extracted from parameters of a job search. Next, the management apparatus matches the one or more entities to one or more of the mappings in the index. The management apparatus then adds one or more jobs in the one or more of the mappings to search results of the job search.

In addition, one or more components of computer system 500 may be remotely located and connected to the other components over a network. Portions of the present embodiments (e.g., analysis apparatus, model-creation apparatus, management apparatus, data repository, model repository, online network, etc.) may also be located on different nodes of a distributed system that implements the embodiments. For example, the present embodiments may be implemented using a cloud computing system that generates semantically relevant search results for job searches conducted by a set of remote users.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used Implementation of these embodiments is not intended to supersede or interfere with the members, privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method comprising:
for each entity type of a plurality of entity types, obtain a plurality of instances of training data, each instance of training data comprising a portion of text extracted from a job posting and a label indicating text within the portion of text is an entity corresponding with the entity type, wherein the plurality of entity types include a company, a title, an employment type, an industry, a job function, a seniority, a skill, a location, an irrelevant entity or any combinations thereof;
providing the plurality of instances of training data for each entity type to a machine learning algorithm to train a machine learning model to identify, within a portion of text, an entity and corresponding entity type;
applying the machine learning model to portions of text extracted from a second plurality of job postings to identify entities and corresponding entity types in the portions of text in the second plurality of job postings; and
creating an index comprising mappings of the identified entities and corresponding entity types to subsets of the second plurality of job postings in which the identified entities and corresponding entity types are found.

2. The method of claim 1, further comprising:
obtaining one or more entities and corresponding entity types extracted from parameters of a job search;
matching the one or more entities and corresponding entity types to one or more of the mappings in the index; and
adding one or more job postings in the one or more of the mappings to search results of the job search.

3. The method of claim 2, wherein obtaining the one or more entities and corresponding entity types extracted from the parameters of the job search comprises:
matching a parameter of the job search to a standardized value for an entity.

4. The method of claim 1, wherein the label indicating text within the portion of text is an entity corresponding with an entity type are obtained from fields storing structured data for the first set of job postings.

5. The method of claim 1, wherein providing the p plurality of instances of training data for each entity type comprises:
locating the entities within the portions of text within the first plurality of job postings; and
training the machine learning model to identify entity types corresponding with the labels based on the portions of text containing the corresponding entities in the first plurality of job postings.

6. The method of claim 1, wherein applying the machine learning model to the second plurality of j ob postings to identify the entities and corresponding entity types within the portions of text in the second plurality of job postings comprises:
parsing a job posting into one or more portions of text;
extracting one or more text windows comprising a keyword from a portion in the one or more portions of text; and
applying the machine learning model to the one or more text windows to generate a prediction of an entity and corresponding entity type for the keyword.

7. The method of claim 6, wherein applying the machine learning model to the one or more text windows to generate the prediction of the entity and corresponding entity type for the keyword comprises:
obtaining one or more predictions generated by the machine learning model from the one or more text windows; and
aggregating the one or more predictions into a final prediction of the entity and corresponding entity type for the keyword.

8. The method of claim 6, wherein applying the machine learning model to the one or more text windows to generate the prediction of the entity and corresponding entity type for the keyword comprises:
segmenting words in the one or more text windows into sub-words; and
inputting the sub-words into the machine learning model to generate the prediction of the entity and corresponding entity type for the keyword.

9. The method of claim 6, wherein creating the index comprising the mappings of the entities and corresponding entity types to the subsets of the second plurality of job postings in which the entities are found comprises:
mapping a representation of the entity and the keyword to one or more job postings in the second plurality of job postings for which the prediction of the entity and corresponding entity type for the keyword was generated.

10. The method of claim 6, wherein each portion in the one or more portions comprises at least one of:
a sentence;
a paragraph; and
a line.

11. A non-transitory computer-readable storage medium storing instructions that when executed by a computer cause the computer to perform a method, the method comprising:
for each entity type of a plurality of entity types, obtain a plurality of instances of training data, each instance of training data comprising a portion of text extracted from a job posting and a label indicating text within the portion of text is an entity corresponding with the entity type, wherein the plurality of entity types include a job posting, a title, an employment type, an industry, a job function, a seniority a skill, a location, an irrelevant entity or any combinations thereof;
providing the plurality of instances of training data for each entity type to a machine learning algorithm to train a machine learning model to identify, within a portion of text, an entity and corresponding entity type;
applying the machine learning model to portions of text extracted from a second plurality of job postings to identify entities and corresponding entity types in the portions of text in the second plurality of job postings; and
creating an index comprising mappings of the identified entities and corresponding entity types to subsets of the second plurality of job postings in which the identified entities and corresponding entity types are found.

12. A system comprising:
a processor for executing machine-readable instructions; and
a memory storage device storing machine-readable instructions thereon, which, when executed by the processor, cause the system to perform operations comprising:
for each entity type of a plurality of entity types, obtain a plurality of instances of training data, each instance of training data comprising a portion of text extracted from a job posting and a label indicating text within the portion of text is an entity corresponding with the entity type, wherein the plurality of entity types include a company, a title, an employment type, an industry, a job function, a seniority, a skill, a location, an irrelevant entity or any combinations thereof;
providing the plurality of instances of training data for each entity type to a machine learning algorithm to train a machine learning model to identify, within a portion of text, an entity and corresponding entity type;
applying the machine learning model to portions of text extracted from a second plurality of job postings to identify entities and corresponding entity types in the portions of text in the second plurality of job postings; and
creating an index comprising mappings of the identified entities and corresponding entity types to subsets of the second plurality of job postings in which the identified entities and corresponding entity types are found.

13. The system of claim 12, wherein the machine-readable instructions, when executed by the processor, cause the system to perform further operations comprising:
obtaining one or more entities and corresponding entity types extracted from parameters of a job search;

matching the one or more entities and corresponding entity types to one or more of the mappings in the index; and adding one or more job postings in the one or more of the mappings to search results of the job search.

14. The system of claim 13, wherein obtaining the one or more entities and corresponding entity types extracted from the parameters of the job search comprises:

matching a parameter of the job search to a standardized value for an entity.

15. The system of claim 12, wherein the label indicating text within the portion of text is an entity corresponding with an entity type are obtained from fields storing structured data for the first set of job postings.

16. The system of claim 12, wherein providing the p plurality of instances of training data for each entity type comprises:

locating the entities within the portions of text within the first plurality of job postings; and training the machine learning model to identify entity types corresponding with the labels based on the portions of text containing the corresponding entities in the first plurality of job postings.

17. The system of claim 12, wherein applying the machine learning model to the second plurality of job postings to identify the entities and corresponding entity types within the portions of text in the second plurality of job postings comprises:

parsing a job posting into one or more portions of text;

extracting one or more text windows comprising a keyword from a portion in the one or more portions of text; and applying the machine learning model to the one or more text windows to generate a prediction of an entity and corresponding entity type for the keyword.

18. The system of claim 17, wherein applying the machine learning model to the one or more text windows to generate the prediction of the entity and corresponding entity type for the keyword comprises:

obtaining one or more predictions generated by the machine learning model from the one or more text windows; and aggregating the one or more predictions into a final prediction of the entity and corresponding entity type for the keyword.

19. The system of claim 17, wherein applying the machine learning model to the one or more text windows to generate the prediction of the entity and corresponding entity type for the keyword comprises:

segmenting words in the one or more text windows into sub-words; and inputting the sub-words into the machine learning model to generate the prediction of the entity and corresponding entity type for the keyword.

20. The system of claim 17, wherein creating the index comprising the mappings of the entities and corresponding entity types to the subsets of the second plurality of job postings in which the entities are found comprises:

mapping a representation of the entity and the keyword to one or more job postings in the second plurality of job postings for which the prediction of the entity and corresponding entity type for the keyword was generated.

21. The system of claim 17, wherein each portion in the one or more portions comprises at least one of:

a sentence;

a paragraph; and a line.

* * * * *